United States Patent Office 3,266,997
Patented August 16, 1966

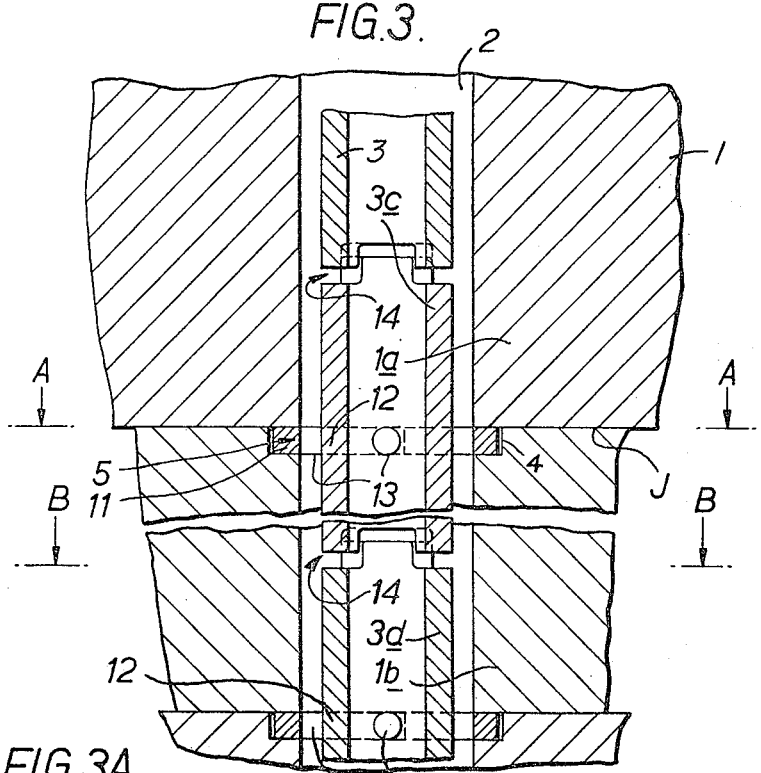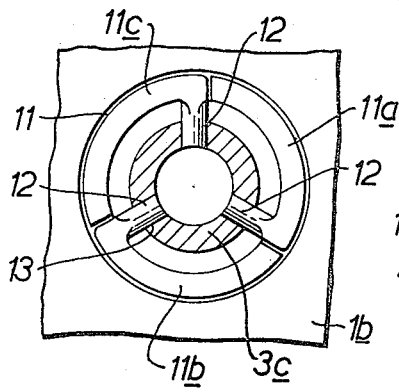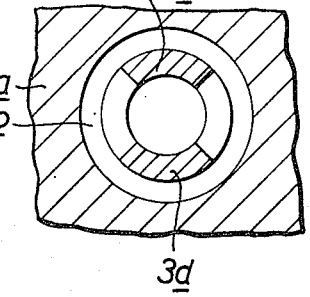

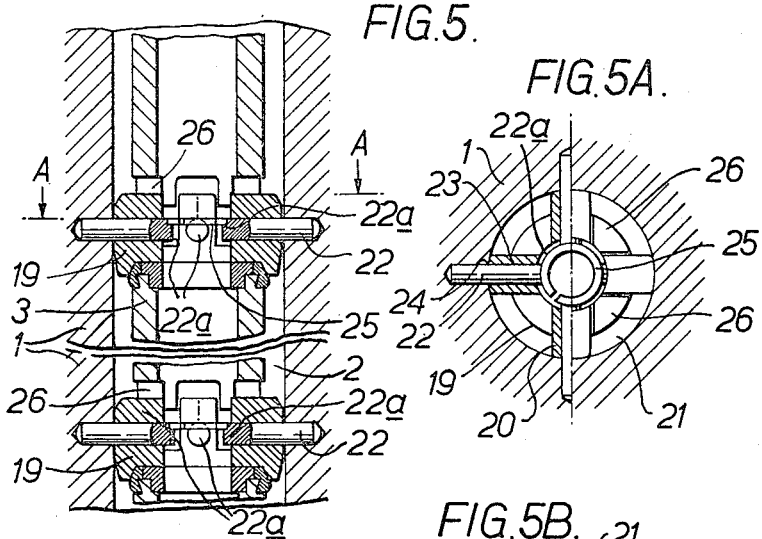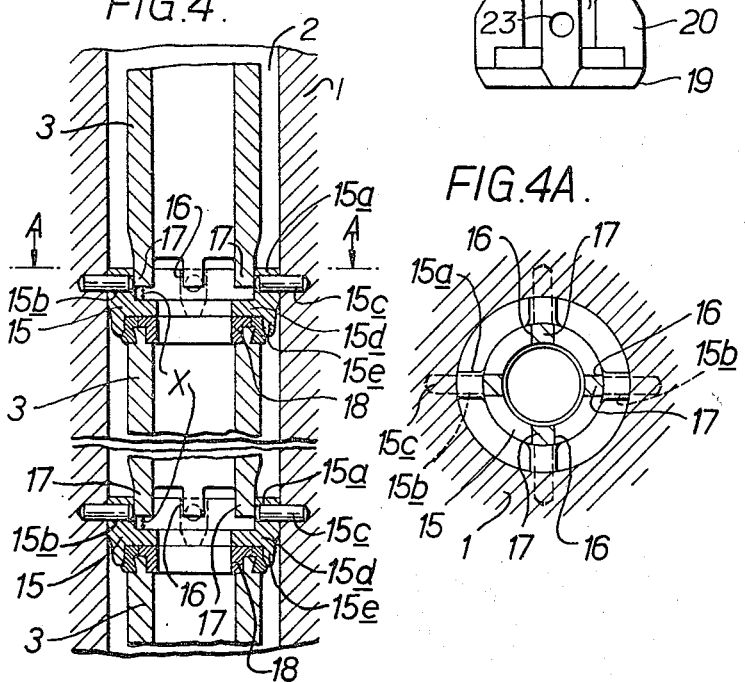

3,266,997
MEANS FOR SUPPORTING NUCLEAR FUEL COMPONENTS IN MODERATOR CHANNEL
Alan Thomas Hooper, Weymouth, Dorset, and Albert George Montgomery, Dorchester, Dorset, England, assignors to United Kingdom Atomic Energy Authority, London, England
Filed Feb. 13, 1963, Ser. No. 258,278
Claims priority, application Great Britain, Feb. 15, 1962, 5,818/62
1 Claim. (Cl. 176—41)

This invention relates to means for supporting elongated nuclear fuel elements or components within coolant channels in a nuclear reactor and is concerned with means for providing support for a number of such components arranged within the same coolant channel.

The invention aims to provide an improved means of supporting such components which will allow for certain displacements of the components relative to the wall of the coolant channel to accommodate limited dimensional changes under the effects of heat and radiation.

According to the invention in a nuclear reactor having vertical coolant channels within the reactor core, there is provided means attached to the channel wall for supporting each fuel component such that the terminal portions of adjacent fuel components are spaced apart axially and means for centralizing each fuel element with respect to the channel wall.

Also, according to the present invention, in a nuclear reactor having a vertical coolant channel within the reactor core for accommodating a number of fuel components in superposition, there is provided support means, attached to the channel wall, for supporting each component centrally within the channel and a castellated guide means formed between the free end of one component and the next adjacent component, the castellated guide means being arranged to allow relative displacement between fuel components in a direction longitudinally of the channel axis. The castellated guide means may also allow restricted displacement of the components relative to one another and the channel wall in a direction transverse the channel axis. The castellated guide means may be formed by the inter-engagement of adjacent castellated end faces at the free ends of elongated fuel components or, alternatively, by one castellated free end of one component and the complementarily formed portion of a support member located by the channel wall and serving as support means for supporting the next adjacent component centrally within the channel.

Several embodiments of the invention will now be described by way of example with reference to the accompanying diagrammatic drawings in which, FIGS. 1–5 show axial cross-sections through cylindrical fuel channels extending within a nuclear reactor moderating structure and, FIGS. 1A–5A are cross-sections on the lines A—A in FIGURES 1–5 respectively.

FIG. 3B is a cross-section on line B—B of FIGURE 3, and

FIG. 5B is an outside elevation of a part shown in FIGURE 5.

Figure 1:
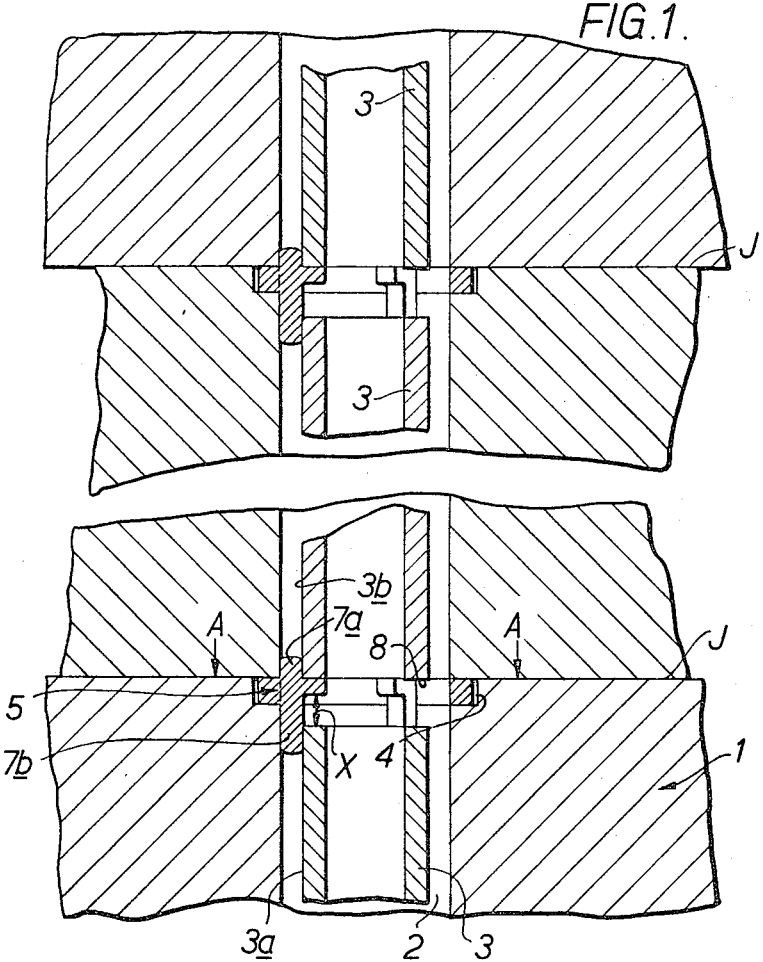
Figure 1A:
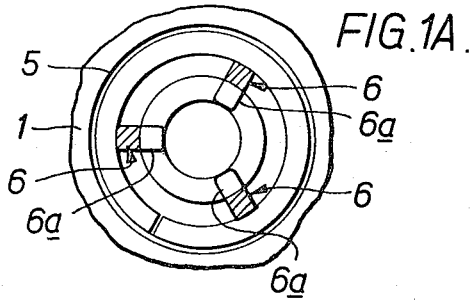
Figure 2:
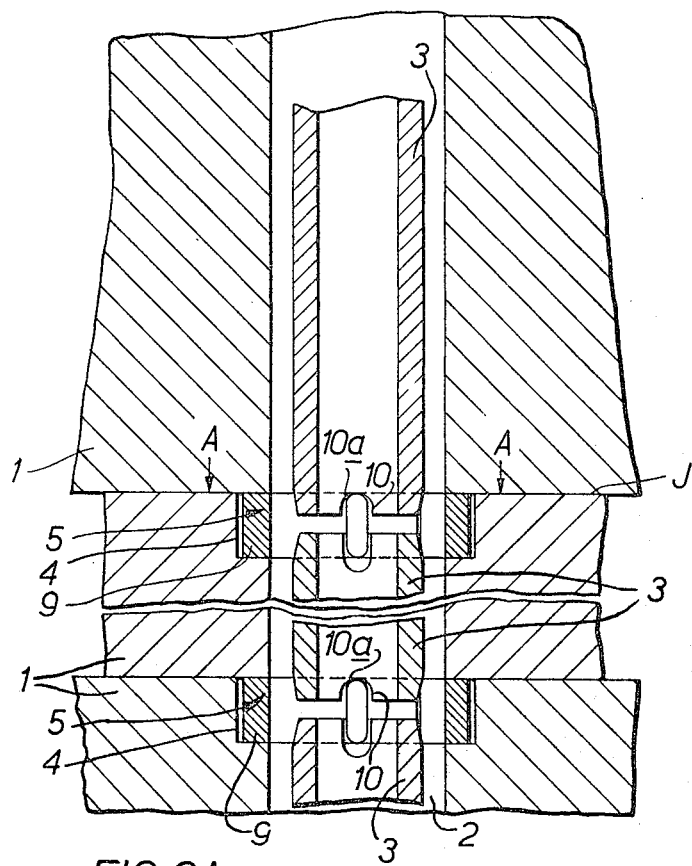

In FIGS. 1–5 the moderator material, indicated by numeral 1 contains a vertically extending coolant channel 2 in which a number of fuel elements in the form of tubes 3 of fuel bearing material are arranged in superposition. The embodiments shown in FIGS. 1 and 2 are particularly suited to a downward coolant flow, whilst in the remaining embodiments the coolant flow direction is immaterial.

In FIGS. 1–3 the moderator is built-up from a series of blocks, e.g. of graphite, which may be hexagonal in plan so that they can be assembled in juxta-position with axes parallel to form a core structure. The coolant channels as at 2 are formed by the coincident holes in the blocks and advantage is taken of the transverse joint J between blocks in order to form annular groove 4 to serve as seatings for location pieces 5.

In FIG. 1 the location piece 5 comprises a split ring which has three radial splines 6 equi-spaced on its inner diameter. The splines 6 each have axial projections 7a, 7b forming in effect a castellated guide means, the projections extending in opposite axial directions between the wall of the coolant channel 2 and the outer surfaces 3a, 3b of the superimposed fuel tubes 3. The radial portion 6a of the splines project radially inwards for a sufficient distance to support the lower annular end face 8 of the adjacent fuel tube, whilst the depths of the moderator blocks are so chosen in relation to the axial length of the fuel tubes 3 that there is an axial clearance X between the end face of the lower fuel tube 3 and the underside of the radial portion 6a of the spline.

With a number of fuel tubes, arranged as shown, each tube 3 is supported on its lower end face and permitted axial displacement, whilst radial restraint is maintained, at both ends by projections 7a, 7b of the ring 5.

In FIG. 2 the arrangement is substantially similar to that of FIG. 1, but the locating device 9 in this case does not have projections between the coolant passage wall and the outer wall of fuel tubes.

The device 9 is a split ring with three radial splines 9a and the adjacent ends of the fuel tubes are castellated to form in cooperation with the splines 9a, a castellated guide means. To achieve this, the said ends of the fuel tubes are chamfered and formed with short axial grooves 10 having their ends 10a radiused, as shown. The splines 9a enter the grooves 10, each spline serving to support the upper tube centrally within the channel whilst serving to guide the lower tube when longitudinal growth occurs.

Figure 2A:
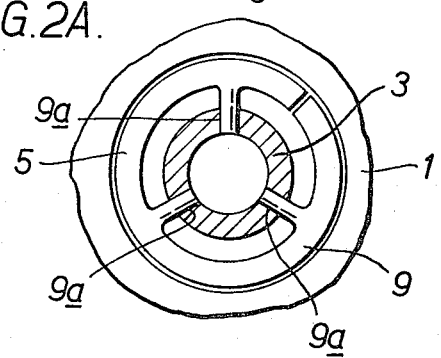

As a modification of the construction shown in FIGS. 2–2A the axial grooves 10 may be elongated for a sufficient axial distance to allow the ends of the fuel tubes to abut one another. Longitudinal growth of the fuel tubes may be accommodated by providing for the accumulated extension of the fuel components at the upper end of each channel.

In FIGS. 3, 3A, 3B each upper and lower fuel tube as at 3c and 3d respectively, is supported intermediate its ends at a position which is arranged to coincide with the line of the joint J between the blocks 1a, 1b. Between the blocks are annular grooves for a retainer ring 11. The ring 11 is in three segments 11a, 11b, 11c each with a radial projection 12 such that the projections are spaced at 120° around the inner face of the ring. The projections 12 extend radially inwards each to enter a hole 13 in the fuel tube.

The adjacent ends of upper and lower fuel tubes 3c, 3d are castellated at 14 to provide a guide means to accommodate relative longitudinal displacement. In the cold condition, the adjacent castellations inter-engage leaving sufficient longitudinal clearance for restricted displacement between the tubes 3c, 3d.

In FIGS. 4, 4A each fuel tube 3 is supported by a locating ring 15 which serves also, in co-operation with the adjacent end of the upper fuel tube, as a castellated guide means. The piece 15 is a ring, the upper portion of which has four grooves 16 at positions spaced 90° apart for receiving the projections 17 of the castellated end of the upper fuel tube. At these positions the ring has projections 15a drilled radially at 15b for locating pins 15c.

The lower part of the ring 15 has an internal shoulder 15d and a skirt 15e which together present an annular groove to the lower fuel tube and form a means of attachment therewith through an intermediate composite ring 18 fixed to the adjacent end of the fuel tube.

The ring 18 is fixed to the fuel tube by a dovetail joint, the male portion of which, in this case, is preformed on the upper and face of the lower fuel tube. The ring 18 is formed by the inner sleeve and an outer split bush which is an interference fit in the skirt 15e.

Thus each fuel tube depends from a locating ring as at 15 which is fixed to the cooling channel wall, with its lower free end entering in the grooves 16 in the next lower ring 15 which forms a castellated guide means. The clearance X between the lower end face of each tube and the upper face of the shoulder 15d of the ring 15 allows for longitudinal growth of the fuel tube whilst radial displacement is restrained at each end.

In FIGS. 5 and 5A, the upper ends of the fuel tubes 3 are located in the coolant channel by a ring 19, the lower portion of which is secured to the end of the fuel tube by the same means as described with reference to FIG. 4. However, the upper portion of the ring 19 is cut away to provide deep castellations 20, the spaces 21 between which extend to the ring periphery. Locating pins 22 slidable in radial holes 23 in the castellations are maintained in engagement with holes 24 in the coolant channel wall by a circlip 25 which engages grooves 22a cut in the inner ends of the pins 22.

The adjacent free end of the upper fuel tube is formed with castellations 26 which, when the tubes are in the cold condition, enter between the castellations 20 of the ring 19, leaving sufficient longitudinal clearance to accommodate for fuel tube growth under operating conditions.

In this construction the free ends of the fuel tubes are allowed radial displacement.

FIG. 5B shows an outside elevation of the ring 19.

Whilst in the above described embodiments wherever radial splines are described, they extend inwardly from a ring supported in the moderator; of course, these elements may be modified by arranging a castellated guide ring between fuel components having radially outwardly directed splines engaging slidably in grooves formed in the moderator block faces J.

We claim:

A vertically extending coolant channel extending within a mass of nuclear moderating material, a plurality of tubes of nuclear fuel bearing ceramic material arranged in superposition within the channel and supported from the channel wall by support means, said supports means comprising an annular member fixed to the channel wall having radially inwardly projecting portions engaging the periphery of the fuel bearing tube, the annular member being a three part ring, each part having a radial extending spigot and means for lodging the ring in the channel wall with the spigots directed radially inwards towards the channel, the spigots engaging holes formed at a position intermediate the ends of the tube which ends are formed with intergaging castellations.

References Cited by the Examiner

UNITED STATES PATENTS

| | | | |
|---|---|---|---|
| 2,824,056 | 2/1958 | Leverett | 176—32 |
| 2,985,575 | 5/1961 | Dennis et al. | 176—43 |
| 3,100,743 | 8/1963 | Aubert et al. | 176—87 |
| 3,105,035 | 9/1963 | Weems | 176—77 |
| 3,127,320 | 3/1964 | Hainzelin et al. | 176—64 X |

FOREIGN PATENTS

| | | |
|---|---|---|
| 220,648 | 2/1959 | Australia. |
| 784,890 | 10/1957 | Great Britain. |
| 875,462 | 8/1961 | Great Britain. |

OTHER REFERENCES

Müller: German application No. 1,048,362, printed Jan. 8, 1959 (2 pages spec., 2 shts. dwg.), KL 21g 21/20.

L. DEWAYNE RUTLEDGE, *Primary Examiner.*

CARL D. QUARFORTH, *Examiner.*

R. C. LYNE, R. L. GRUDZIECKI, *Assistant Examiners.*